May 6, 1941.  W. E. GRUENING  2,240,905
VENT MEANS FOR WATERLESS GASHOLDERS AND THE LIKE
Filed Nov. 25, 1938  2 Sheets-Sheet 1

INVENTOR.
BY William E. Gruening
Wood & Wood
ATTORNEYS

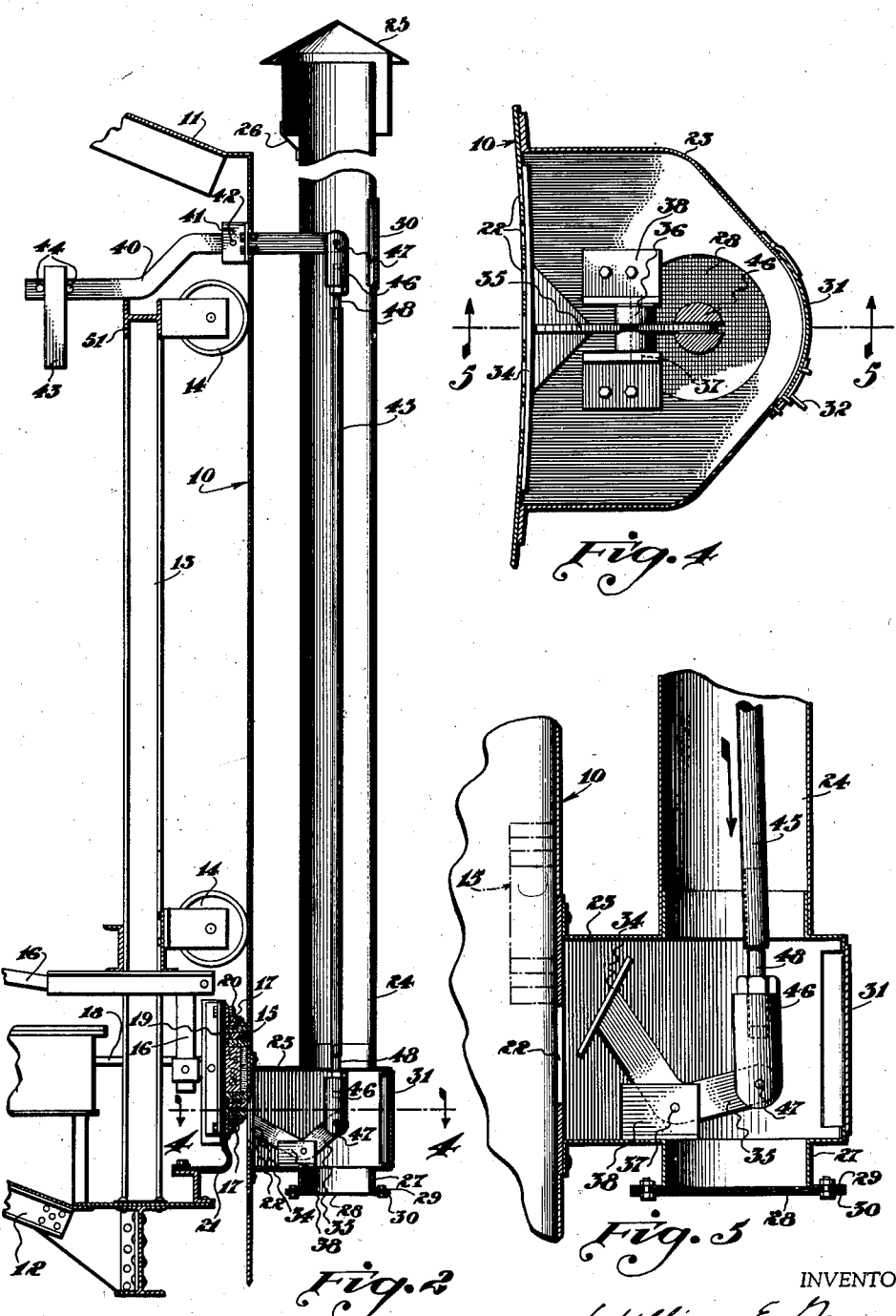

Patented May 6, 1941

2,240,905

UNITED STATES PATENT OFFICE 2,240,905

VENT MEANS FOR WATERLESS GASHOLDERS AND THE LIKE

William E. Gruening, Cincinnati, Ohio, assignor to The Stacey Brothers Gas Construction Company, Cincinnati, Ohio, a corporation of Ohio Application November 25, 1938, Serial No. 242,312

6 Claims. (Cl. 48—174)

This invention relates to waterless gasholders and is particularly directed to an improved vent mechanism, adapted to release the gas when the holder has been filled to capacity.

Past practice was to provide a blowoff or gas venting pipe located around the shell or holder and near the top, through which pipe the gas was released after the maximum capacity of the tank had been reached. For this purpose, openings were provided in the shell, through which the gas might pass to the outside atmosphere after the piston had passed over the openings. The openings were covered on the outside of the shell by means of a box to which a pipe had been attached. This pipe extended to a point above the roof of the tank so that the gas was definitely carried away from the holder.

Now, in the dry type gasholder, grease is used in the seal for the purpose of lubricating the piston. Thus, as the shell moves to a point adjacent the openings, the grease can pass through the openings and be lost from the seal. When force feed means is used for the grease, considerable grease is lost through the openings. If the seal were to remain opposite the openings in the shell, the feeding means could continue to feed the grease through the seal and through the vent pipe until all the grease were lost. It is therefore necessary to provide some means whereby the grease is retained within the seal despite the fact that the grease is passing the openings.

Furthermore, these holders are often used to hold gas which is poisonous and heavier than air. In such cases, if the piston proceeded above the openings, the pipe would become filled with gas as the excess gas tended to escape, and, when the piston passed below the openings, the gas, which is heavier than air, would remain in the pipes and flow back into the holder to the region above the piston. In practice, there is often a considerable amount of gas retained and returned in this manner and, as stated, it is not only sometimes poisonous, but, at any time, very explosive.

Accordingly, it has been the object of the present inventor to provide an apparatus, having for its purpose, the prevention of excess loss of grease during the time that the seal ring is passing over or is adjacent the vent openings in the shell. Also, it has been the object of the inventor to prevent gas, which is heavier than air, from returning into the holder above the piston after the piston lowers below the openings. For this purpose, a mechanism has been provided which is effective for keeping these openings closed at all times other than when the piston is above them.

It has been a further object of the inventor to provide a venting apparatus for these purposes which will, not only fully release the vent gases which are lighter than air, but also fully release those gases which are heavier than air. More specifically, it has been the purpose to arrange the vent pipes so that they clear themselves of gas regardless of the weight of the gas with respect to the air, and, at the same time, to prevent return of this gas back into the tank.

Other objects and certain advantages will be more fully set forth in the description of the accompanying drawings, in which:

Figure 2 is an enlarged vertical sectional view taken through the vent means of the present invention.

Figure 4 is a sectional view taken on line 4—4, Figure 2, detailing the valve construction.

Figure 5 is a sectional view taken on line 5—5, Figure 4, showing the valve in opened position.

Figure 1:
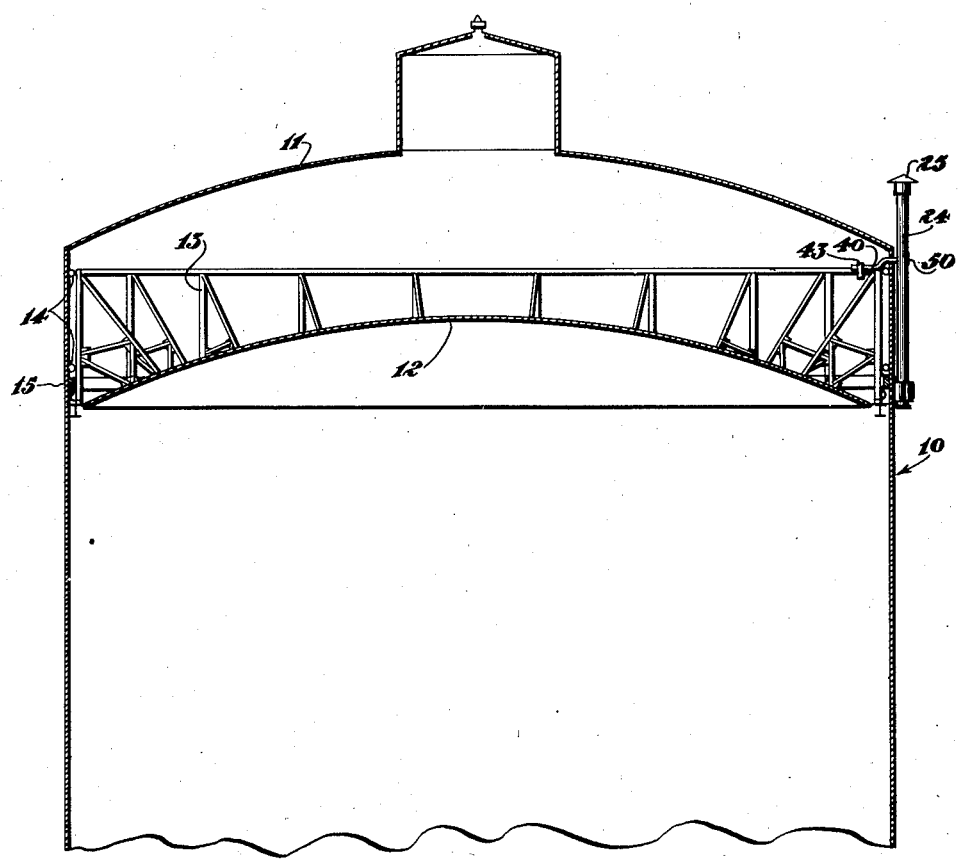
Figure 1 is a general sectional view taken diametrically through a tank and showing the general relationship of the apparatus of the present invention to a gas holder.
Figure 3:
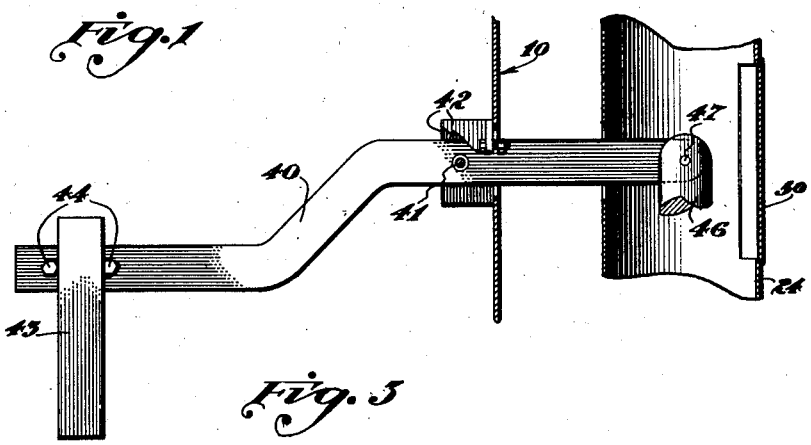
Figure 3 is an enlarged fragmentary sectional view taken from Figure 2, detailing the weight operated lever of the valve of the vent means.

Referring to the drawings, the tank is generally indicated at 10 and is of cylindrical form. A cover or fixed roof 11 is provided for the holder. A piston 12 is disposed in the holder, and moves up and down, as determined by the amount of gas contained in the holder. The piston includes a framework 13 of considerable height which provides upper and lower rows or sets of guide rollers 14. These rollers maintain the piston in stable or level position in the tank.

A sealing ring 15 is disposed around the periphery of the piston and is urged against the cylindrical wall by means of weight levers 16. The sealing unit, disclosed herein, is of standard construction providing upper and lower sets of packing rings 17—17, held upon a spacer and fixed to a dilatable ring structure 19 by means of bolts 20. A fabric sheet 21 connects the lower end of the ring assembly to the piston structure. Grease is fed under pressure, to the space, provided between the sets of packing rings, by any suitable means through a pipe 18. This grease serves to lubricate the sealing unit.

A series of ports or escape openings 22 are provided in a horizontal line in the side of the holder wall. These openings are disposed below the roof, a distance slightly greater than the total height of the piston structure. Enclosing the openings 22 is a box or casing 23. A vent pipe 24 rises from the box to a point at or above the roof of the holder. A canopy or cover 25, in the form of a cap, is fixed to the upper end of the pipe by means of brackets 26. This cover prevents the entrance of water and, at the same time, permits the escape of rising gas by way of the space between the depending apron of the cap and the pipe wall. A short pipe 27 extends downwardly from the box, and a screen element 28 covers the opening into the box through this pipe. The screen is held in place against the outward flange 29 of the pipe by means of a ring 30.

A hinge cover plate 31 covers an opening in the outer wall of the box, which provides access to the box. A latch 32 fixes this cover plate in position. A control valve 34 is provided within the casing. This valve consists of an elongated plate adapted to engage over the openings. The plate is fixed to the arm of a fulcrumed lever 35 intermediate the length of the plate. The arm includes a hub 36, rotatably mounted on a pivot pin 37 extending between and carried by a pair of angle iron brackets 38.

The valve is actuated by means of a lever 40 pivoted intermediate its ends on a pin 41 extended between and carried by angular iron brackets 42. These brackets are fixed to the inside wall of the holder at the upper end of the tank. The lever projects through the wall of the tank and its inner end carries a weight 43. An opening in the weight permits it to be engaged on the lever where it is held against displacement. The outer end of the lever projects into the vent pipe and is connected to the inner arm of the valve lever by means of a link 45. Bifurcated elements 46, one on each end of the link, are secured to the respective arms by means of pins 47 and are adjustably mounted with respect to the ends of the link by means of screw-threaded extensions 48 threaded into the pipe constituting the link. A door 50 covers an opening in the vent pipe adjacent the operating lever. This door is of the same construction as the door 30.

Now, as illustrated in Figure 2, the upper girder 51 of the piston structure is adapted to contact the vent operating lever 40. At this time, as excess gas is admitted to the holder, the piston will rise and open the valve (see Figure 5). Until the piston, particularly the sealing means, has passed the openings, the valve will remain closed. When the sealing means is above the openings, excess gas will pass into the vent pipe and will pass upwardly or downwardly through the respective outlets, depending upon whether or not it is lighter or heavier than air. When the excess of gas is released, the piston will move down and the weight 43 will close the valve as the piston structure disengages the lever 40.

Having described my invention, I claim:

1. In a gas holder of the type providing a tank wall having a sealing piston movable therein, said tank wall including a gas exhaust opening near the top of the tank, an exhaust duct extending from said opening upwardly externally of the tank, said duct opening at its upper and lower ends, a lever fulcrumed on the tank wall, a valve engaged over said opening, a link between the outer end of the lever and the valve, said lever extending inwardly into the tank and engageable by the upper portion of the piston, and a weight mounted on the inner end of the lever effective for closing the valve except when the piston engages said lever.

2. In a gas holder tank of the type providing a tank wall and a piston movable therein, a tank wall having a top thereon, a piston movable vertically within said tank wall and having a sealing unit around its periphery engaging the wall, said sealing unit including a grease chamber opening toward the wall, said wall including a vent opening therein adjacent the top, a valve for closing said opening, a lever for operating said valve, said lever engageable by the piston when the sealing unit is above the opening, and means for closing the valve when the sealing unit is below the opening.

3. In a gas tank of the type providing a tank wall and a piston movable therein, a gas tank wall, a piston movable within said wall, said wall including a vent opening near the upper end thereof, a box on the wall enclosing the space outside of said opening, a vent pipe in open communication with said box and extending upwardly and downwardly, the upper vent extending at least to the roof of the tank, a valve pivotally mounted in said box for controlling said opening, and a lever pivotally mounted on said tank wall and adapted to be engaged by the piston, said lever linked to said valve, said lever adapted to open the valve when the piston passes above said opening.

4. In a gas tank of the type providing a tank wall and a piston movable therein, a gas tank wall, a piston movable within said wall, said wall including a vent opening, a box enclosing the space outside of said opening, a vertical vent pipe extended through said box and open at both ends, a valve in said box for controlling said vent opening, and a lever mounted on said tank wall and adapted to be engaged by the piston, said lever linked to said valve, said lever adapted to open the valve when the piston passes above said vent opening.

5. In a gas holder tank of the type providing a tank wall and a piston movable therein, a tank wall, a piston movable vertically within said tank wall and having a sealing unit around its periphery engaging the wall, said sealing unit including a grease chamber opening to the wall, said wall including a vent opening therein adjacen tthe top, and valve means for said vent opening, said valve means effective for opening the vent opening when the sealing unit is above the opening.

6. In a gas holder of the type providing a tank wall having a sealing piston movable therein, said tank wall including a gas vent opening near the top of the tank, an operating lever fulcrumed on the tank wall above the piston, a valve engaged over said opening and carried by a pivoted lever, a link between the outer ends of the respective levers, said lever extending inwardly into the tank and engageable by the piston upon upward movement of the piston, and means effective for closing the valve except when the piston is in engagement with the lever.

WILLIAM E. GRUENING.